Nov. 6, 1956 P. E. GELDHOF ET AL Re. 24,235

CLOTHES DRIER AND ELECTRICAL CONTROL THEREOF

Original Filed Oct. 22, 1949 4 Sheets-Sheet 1

Inventors
Peter Eduard Geldhof
Harold E. Morrison
by Hill, Sherman, Meroni, Gross & Simpson Attys CLOTHES DRIER AND ELECTRICAL CONTROL THEREOF
Original Filed Oct. 22, 1949 4 Sheets-Sheet 2
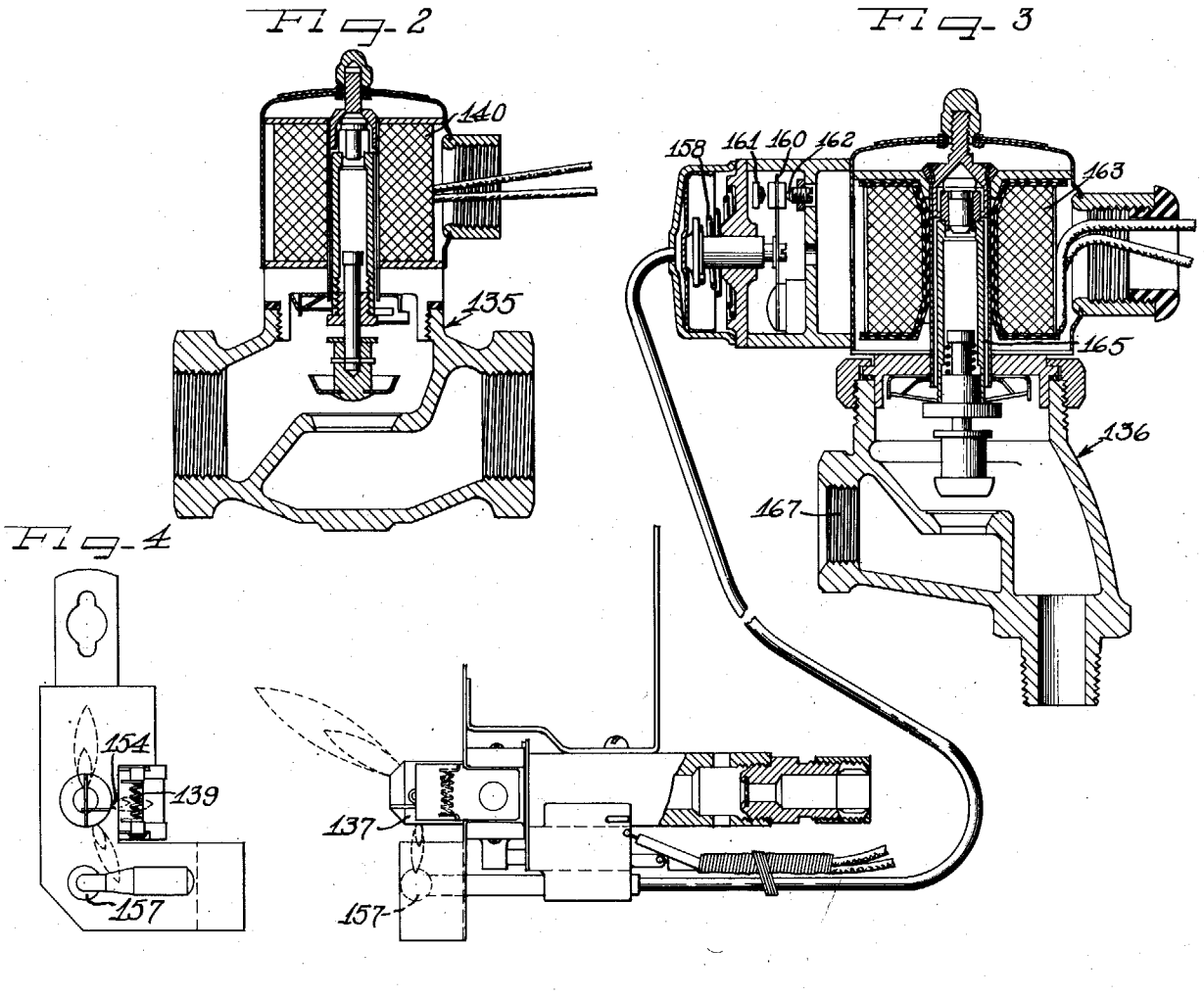
Inventors
Peter Eduard Geldhof
Harold E. Morrison
by Hill, Sherman, Meroni, Gross & Simpson Attys

CLOTHES DRIER AND ELECTRICAL CONTROL THEREOF

Original Filed Oct. 22, 1949 4 Sheets-Sheet 3

Inventors
Peter Eduard Geldhof
Harold E. Morrison
By Hill, Sherman, Meroni, Gross & Simpson Attys

CLOTHES DRIER AND ELECTRICAL CONTROL THEREOF

Original Filed Oct. 22, 1949 4 Sheets-Sheet 4

Inventors
Peter Eduard Geldhof
Harold E. Morrison
By Hill, Sherman, Meroni, Gross & Simpson Attys United States Patent Office Re. 24,235
Reissued Nov. 6, 1956

24,235

CLOTHES DRIER AND ELECTRICAL CONTROL THEREOF

Peter Eduard Geldhof and Harold E. Morrison, Benton Harbor, Mich., assignors, by mesne assignments, to Whirlpool-Seeger Corporation, St. Joseph, Mich., a corporation of Delaware Original No. 2,678,814, dated May 18, 1954, Serial No. 208,708, January 31, 1951, which is a division of Serial No. 123,018, October 22, 1949. Application for reissue May 17, 1956, Serial No. 585,596

8 Claims. (Cl. 263—33)

Matter enclosed in heavy brackets [ ] appears in the original patent but forms no part of this reissue specification; matter printed in italics indicates the additions made by reissue.

This invention relates to improvements in clothes driers and controls therefor, and more particularly, relates to improvements in electrical controls controlling the operation of household clothes driers of the type where the clothes are tumbled in a rotating drum through which heated air from a gas burner is circulated.

A principal object of our invention is to provide a new and improved form of clothes drier and control therefor arranged with a view toward utmost simplicity in control and safety in operation.

A further object of our invention is to provide a novel and efficient form of clothes drier and control therefor so arranged that when the temperature rises above a predetermined maximum within the clothes drum, the heat will automatically be turned off without interrupting rotation of the drier drum.

Still another object of our invention is to provide a new and improved circuit for a clothes drier, controlled by a door-operated switch and a timer switch and so arranged that the door operated switch and timer switch are energized to initiate the drying operation when the door is closed, and the timer switch continues to the end of its time cycle irrespective of whether heat may be turned off within the drier due to excessive temperatures, to continue the rotation of the drier drum to the end of the drying cycle to cool and prevent burning of the clothes therein.

These and other objects of our invention will appear from time to time as the following specification proceeds and with reference to the accompanying drawings wherein:

Figure 2 is a longitudinal sectional view taken through one of the control valves for supplying gas to the burner;

Figure 3 is a longitudinal sectional view taken through another of the valves and showing the by-pass connection to the pilot;

Figure 4 is an end view of the pilot used in a drier of the present invention;

[This application is a division of application, Serial No. 123,018, filed on October 22, 1949, now Patent No. 2,635,354, and entitled "Gas Heated Drier."]

*This application is a re-issue of application, Serial No. 208,708, filed on January 31, 1951, and matured as Patent No. 2,678,814, granted May 18, 1954, which is a division of application Serial No. 123,018, filed on October 22, 1949, now Patent No. 2,635,354, granted April 21, 1953 and entitled "Gas Heated Drier."*

The gas burner and pilot of our invention is herein shown as being operative to supply heat to a clothes-drying drum 10 of a household type clothes drier as shown and described in our parent application. The drier itself, therefore, need only be described generally herein.

As herein shown, the drier drum 10 is rotatably mounted within a casing 11 on a bulkhead 12 confronting the rear wall thereof and confining the circulation of air to pass into and out of said drum in a manner clearly shown and described in our parent application, Serial No. 123,018, previously mentioned.

Figure 1:
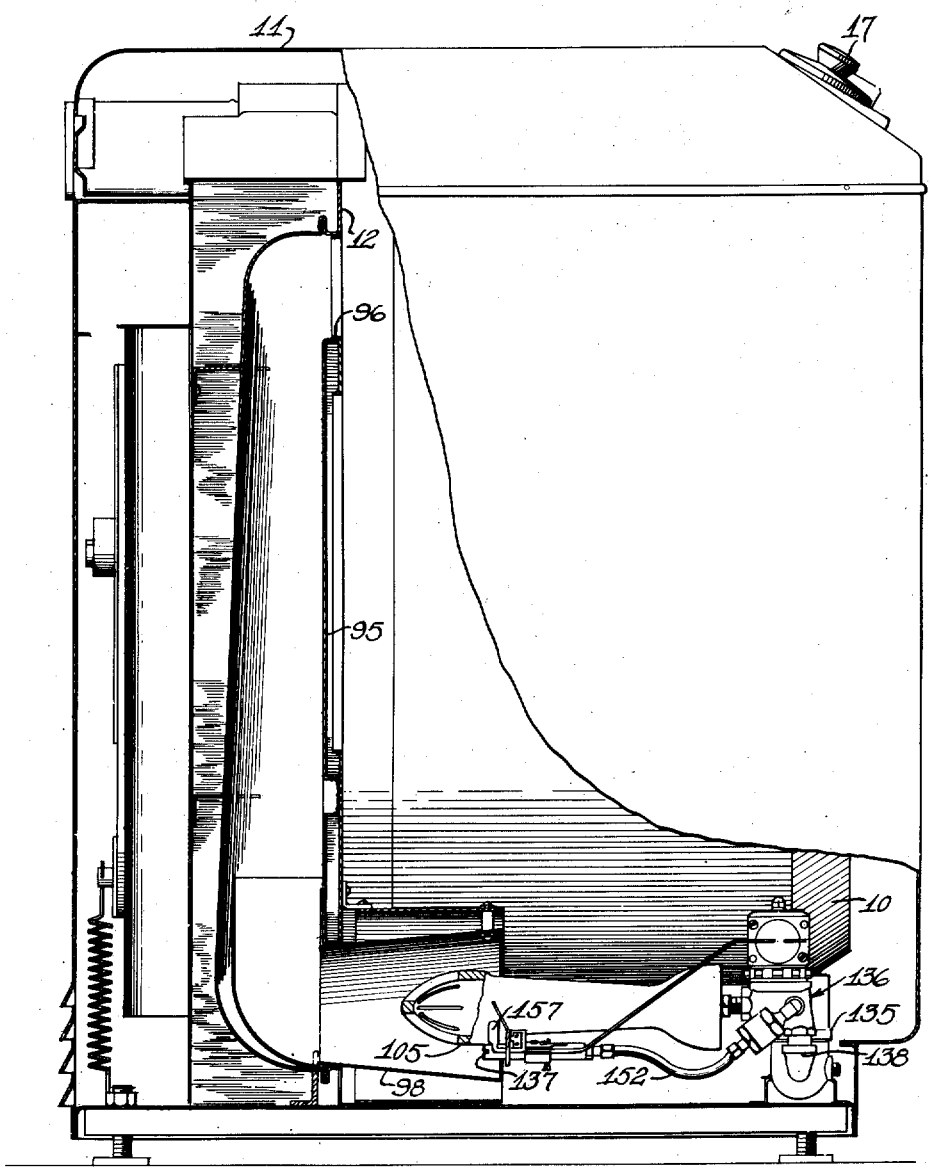
Figure 1 is a view in side elevation of a drier constructed in accordance with our invention with certain parts broken away, and certain other parts shown in transverse section.
Figure 5:
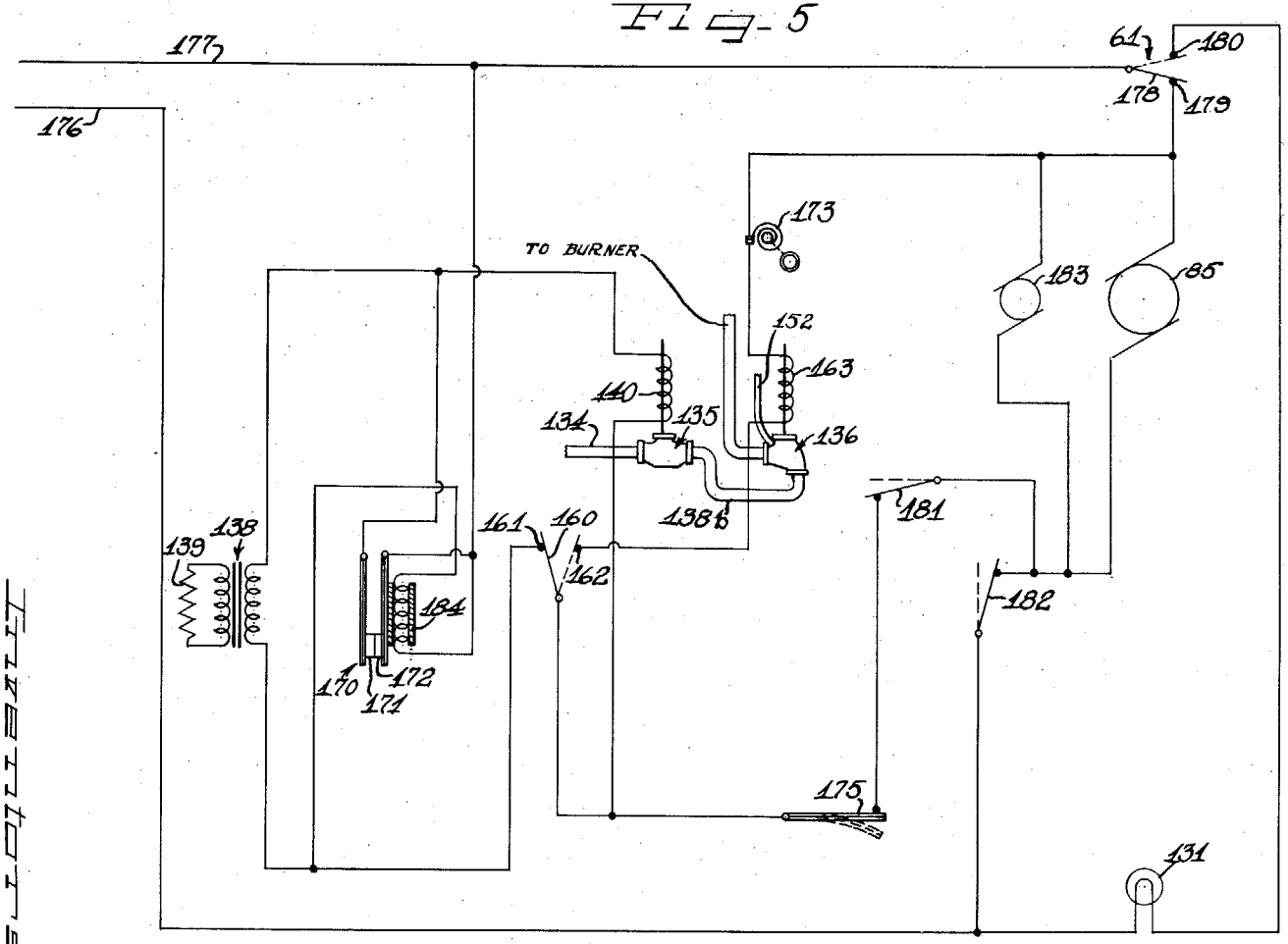
Figure 5 is a schematic wiring diagram of a control circuit for the drier and burner valves.

The drier drum is rotatably driven by means of an electric motor 85, diagrammatically illustrated in Figure 5. The air may be heated for circulation into and out of the drum through the rear wall thereof by means of a gas burner 105 extending within a combustion chamber 98 connected with a flanged opening 96 in the bulkhead 12, by means of a duct 95 extending vertically from said combustion chamber and communicating with said flanged opening.

Referring now in particular to Figures 2, 3 and 5 of the drawings illustrating the gas burner and control circuits therefor, a pipe 134 leading from a gas supply main is connected to deliver gas to a first gas valve 135 which, in turn, delivers gas to a main gas burner supply valve [136] through a pipe 138b. The *first* gas valve[135], upon being opened, also supplies gas through a bleeder tube 152 to a pilot burner 137.

The gas burner 105 may be of well known construction and is supplied with gas from the main burner valve 136, suitably connected thereto. The bleeder line 152 leads from the main burner valve 136 and is connected at its free end with the pilot 137 disposed adjacent the end of the main burner [valve] 105 to supply a gas flame for igniting the gas passing through said main burner valve *housing, but the flow not being controlled by the main burner valve 136.* The pilot flame may be ignited by a glow coil 139 energized by the secondary of a transformer 138. The glow coil 139 is positioned adjacent the pilot 137 to ignite said pilot.

The gas supply and the ignition of the gas is under the control of an especially designed electrical circuit equipped with suitable safety devices to assure safe and efficient operation of the drier. This control, as may be seen best from an inspection of Figure 5, includes a warp switch 170 having metallic contact elements 171 and 172 which will deenergize the control circuit to the gas valve 135 and to the glow or ignition coil 139 in the event that the pilot does not ignite.

The control includes a flame-detecting switch 160 in the main gas valve 136, as shown in Figure 3, and which, in its "cold" position indicates the absence of a pilot flame by engaging contact 161, and in its "hot" position indicates the presence of a pilot flame by engaging the contact element 162. A thermostat 173 is provided to turn the main gas burner on and off during normal operation and thereby control the temperature within the clothes-drying drum 10. A safety thermostatic switch 175 is provided for emergency purposes and is arranged to open at a substantially higher temperature than that of thermostat 173. This safety thermostatic switch 175 may be located on the housing adjacent the hot air supply duct 95.

Provision is also made for lighting the interior of the clothes drum when the door is opened, which is herein shown as being an electric light 131 connected in series with a door switch 61 operated by opening and closing of the drier door (not shown).

The particular manner in which the various elements are electrically connected will now be described. Electrical energy is derived from a suitable source of power through conductors 176 and 177. In one side of the line, the door switch 61 is connected. This door switch 61 includes a movable contact element 178 and two stationary contacts 179 and 180 actuated upon opening and closing of the door, as described in our parent application, Serial No. 123,018, of which this application is a division.

When the door is in its closed position, the movable contact element 178 engages the stationary contact 179, and when the door is in its open position, the movable contact 178 engages the stationary contact 180.

Suitable ignition means is provided for the pilot flame by means of the glow or ignition coil 139 energized from the secondary of a transformer 138, the primary of which is energized through the warp switch 170, the flame-detecting switch 160, and a pair of timer-controlled switches 181 and 182. The switches 181 and 182 are closed upon setting a timer motor 183 to its time-setting position and will remain closed for predetermined periods of time, switch 182 being arranged to stay closed for a longer period of time than switch 181.

It will thus be seen from an inspection of Figure 5 that with the closure of the timer switches 181 and 182 and the door switch 61 so that its movable contact element 178 engages its lower contact 179, current flows through the transformer 138, the glow coil 139, the solenoid 140 of the gas valve 135, through warp switch contact elements 171 and 172 to the other side of the line. Current also flows through the heating element 184 to the other side of the line. The heating element 184 has a metal sheath 184a which absorbs heat providing a time delay to the action of the element 172.

It will also be observed from an inspection of Figure 5 that the closure of the door switch 61 to its lower position energizes the main drive motor through timer switch 182, while the timer motor likewise is energized through a parallel circuit around the main motor 85. It will further be seen that the main gas valve 136 cannot be energized until the pilot flame has heated up the temperature-sensitive bulb or responsive element 157 which actuates the switch 100 against a spring 158 to its "hot" position, namely, with its movable contact element 160 positioned against stationary contact 162. At this time, the solenoid 163 of the main gas valve 136 is energized and the full supply of gas is supplied to the main burner 105. It will be noted that the drum temperature-responsive thermostat 173 is in series with the energization circuit of the main gas valve 136.

It will also be apparent that in the event the temperature rises above a predetermined maximum within the clothes drum 10, the solenoid 163 becomes deenergized and the main gas valve closes.

The pilot is, of course, still burning so that upon dropping of the temperature within the drum, the thermostatic switch 173 upon reclosing will again open the main gas valve. It is to be noted, however, that if, for any reason, the pilot has gone out, the switch 160 will return immediately to its position against contact 161 and prevent reopening of the main gas valve even though the thermostatic switch 173 closes.

Timer switches 181 and 182 are so arranged that timer switch 181 opens a predetermined period of time before the opening of timer switch 182, thus assuring a running of the machine without heat for a predetermined time after the heat is shut off. After this additional period of time has elapsed, contact 182 opens, thus deenergizing both main motor 82 and timer motor 183.

Certain additional safety switches are provided in the circuit for reasons which will be apparent to those skilled in the art. In the event the flame-detecting switch 160 on the gas burner valve does not move from its "cold" to its "hot" position due to failure of current to the glow coil 139, defective glow coil, or failure of gas supply, the warp switch element 170 will open to shut off current to the gas valves 135 and 136 and the transformer 138. The warp switch may be of any conventional construction and is diagrammatically illustrated as a bimetal thermostatic element which is gradually warped by means of its associated heater coil 184 until the elements which have different flexing characteristics, separate to open the circuit. By way of illustration, and not by way of limitation, the period required for operation of the warp switch may conveniently be from 4 to 10 minutes. When the warp switch is open, the motor 85 will continue to run and the current to the warp switch will hold the contacts open. The timer will continue to the end of its schedule and then shut off all current to the machine. When the warp switch cools, it will reset itself and be ready for operation again after the defect has been corrected.

As previously pointed out, the safety switch 175 operates at a higher temperature than the thermostat 173. It thus eliminates danger to the clothes which might be caused by the failure of the thermostat 173, for upon opening of the safety switch 175, the main gas burner valve 136 will be closed, the pilot valve 135 will be closed, and the transformer 138 and warp switch 170 will be deenergized.

The light to illuminate the interior of the drum to facilitate inserting and removing clothes is operated through the door switch 61 when the movable contact element 178 thereof is in its upper position against stationary contact 180. This condition results from the opening of the door.

The thermostat 173 is an adjustable one to facilitate a control of the heating temperature within the drum. In order that the opening and closing temperature of the thermostat 173 may be adjusted, a control knob 17 is provided on the outer side of the cabinet.

Figure 6:
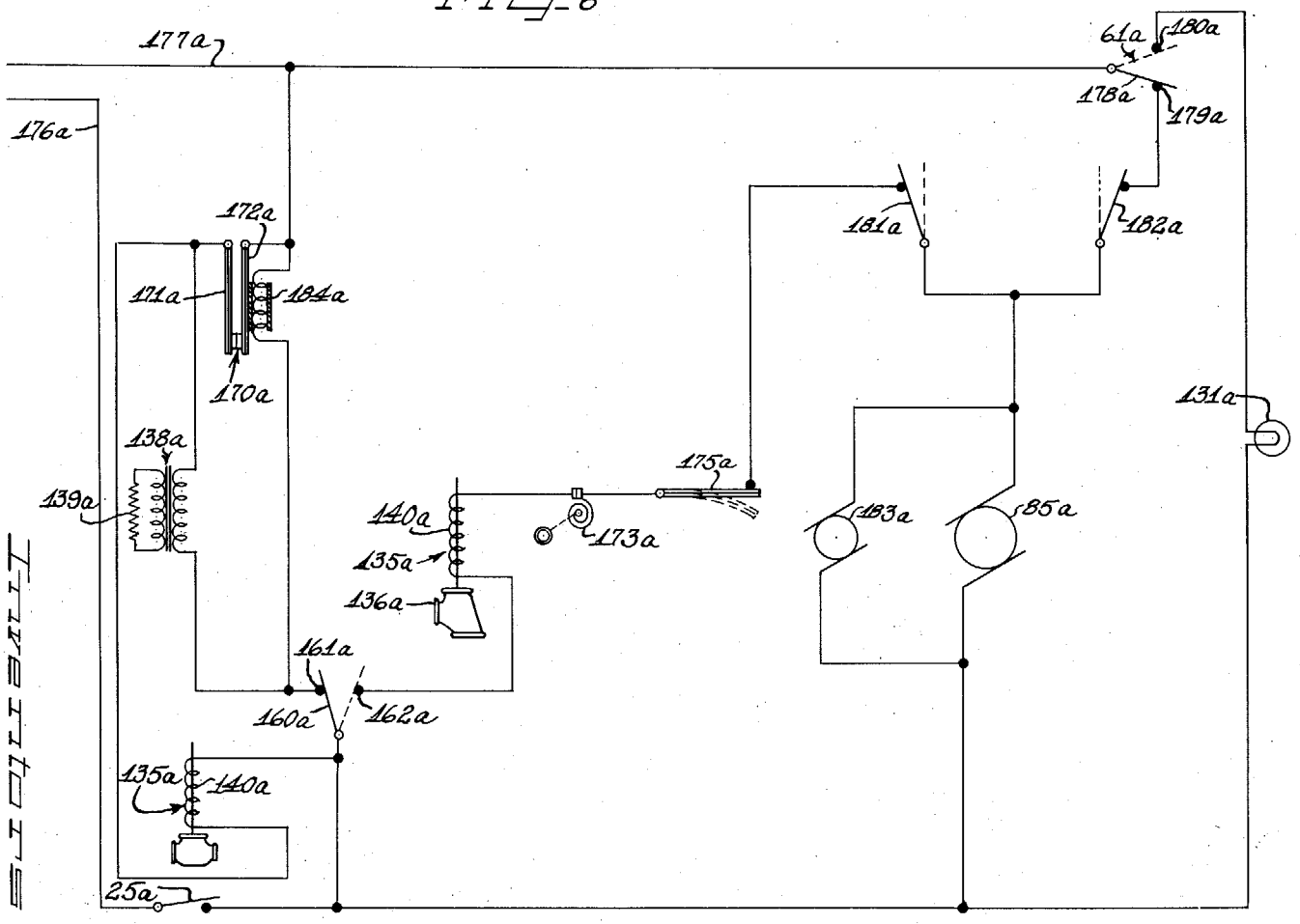
Figure 6 is a schematic wiring diagram of a modified form of control circuit.

In Figure 6, a schematic diagram of a modified control circuit is illustrated. In this circuit, the elements are exactly the same as in Figure 5 and will be designated by the same reference numerals plus an affix "a."

In this circuit, a switch 25a is connected in the conductor 176a to deenergize the entire drier circuit, and the pilot valve solenoid 140a is connected to the conductor 176a at the outer side of the switch 25a, so that it is always energized as long as the switch 25a is closed so that the pilot 137 is continuously supplied with gas even though the washing cycle is completed. Then, after one drying cycle is completed, another can be started immediately without waiting for the transformer 138a to heat the glow coil 139a for starting the pilot burner which would subsequently actuate the hot-cold switch 160a.

It will be understood that modifications and variations may be effected without departing from the scope of the novel concepts of the present invention.

We claim as our invention:

1. A gas-heated clothes drier comprising a cabinet having a rotatable clothes drum journaled therein and a door affording access to said drum, an electric motor mechanically connected to said drum to rotate the same, a main gas burner having a gas supply line connected thereto, a first solenoid-operated valve in said supply line, a second solenoid-operated valve in said supply line between said first valve and said burner, a pilot burner connected to said supply line between said first and second valves, a door switch, a timer having one switch closing upon the setting of the timer to initiate the drying operation and another switch which closes upon initiation of a cycle of operation and which opens after the elapse of a predetermined period of time, an electric energization circuit, a flame switch actuatable by the presence of a flame in said pilot burner, a first stationary contact engaged by said flame switch when no flame is present in said pilot burner, a second stationary contact engaged by said flame switch when a flame is present in said pilot burner, an adjustable thermostatic switch, *a warp switch having a coil connected to the circuit*

*through the first stationary contact of the flame switch and having contacts which open after the coil is in the circuit for a predetermined length of time,* said first valve being electrically connected to said circuit through said *warp switch contacts* [first stationary contact of said flame switch and said timer switch], and said second valve being electrically connected to said circuit through said thermostatic switch, said second stationary contact of said flame switch and said second switch of said timer switch and said door switch, said drum-rotating motor being connected to said circuit through said first switch of said timer switch and said door switch, and said first switch of said timer switch remaining closed after opening of said second switch, to continue rotation of said motor when the flame is out.

2. A clothes drier comprising a cabinet, a rotatable drum within said cabinet, said cabinet having a door opposite one end of said drum, an electric motor connected to drive said drum, electrically controlled heating means, *means* operated by said motor [, means] for circulating heated air through said drum, a door switch movable to a closed position by closure of said door, a timer having two switches closing at different time intervals, said electrically controlled heating means being energized through said second switch and said motor being energized through said door switch through said first switch, said first switch closing prior to said second switch, and said switches opening in a reverse order, whereby said motor and drum continue to rotate after the heat is turned off.

3. A clothes drier comprising a cabinet, a rotatable drum within said cabinet, said cabinet having a door opposite one end of said drum, an electric motor connected to drive said drum, a timer having two switches, one of which closes upon setting of the timing cycle and the other of which closes in a time delayed interval upon the initiation of a cycle of operation and which opens after the elapse of a predetermined period of time, electrically controlled heating means, means driven by said motor for circulating heated air through said drum, a door switch movable to a closed position by closure of said door, said electrically controlled heating means being energized through said second switch of said timer and said door switch, and said drum-rotating motor being energized through said first switch of said timer and through said door switch.

4. In a clothes drier, a cabinet having a door affording access to the interior thereof and a drier drum rotatably journaled therein having a clothes-receiving opening confronting said door, a motor within said cabinet for driving said drum and circulating heated air therethrough, electrically controlled means for heating the air in said drum, and means operable upon closing of said door, for energizing said motor and said electrically controlled means, comprising a door switch having a contact connected to energize said motor upon closing of the door, a timer having one switch in series with said motor and said door switch and closing upon setting of the timer to its cycle of operation, and having another switch in series with said electrically controlled means for heating the air, and a timer motor in parallel with said first motor and energized upon the setting of said timer, to close said second switch after a predetermined time interval, to energize said electrically controlled means for heating the air, and opening prior to the opening of said first switch of said timer, to maintain said motor in operation after the heating means has been shut off, until opening of said door switch.

5. In a clothes drier, a cabinet having a door for access to the interior thereof, a drier drum rotatably mounted within said cabinet and having a clothes-receiving opening confronting said door, a motor within said cabinet for driving said drum and circulating heated air through said drum, electrically controlled means for heating the air in said drum, an energizing circuit operable upon the closing of the door for energizing said motor, said electrically controlled means comprising a door switch having a contact connected to energize said motor upon closing of the door, a timer having one switch in series with said motor and closing on setting of said timer, to initiate the drying cycle and having another switch in series with said electrically controlled means for heating the air in said drum, a timer motor in parallel with said motor and energized upon the setting of said timer to close said one contact and connect said motor in said energizing circuit through said door switch, and a thermostatically operated switch in series with said second switch of said timer and opening when the heat within said drier drum reaches a predetermined value, whereby said motor will continue to rotate said drier drum when the heat is turned off.

*6. A gas heated clothes drier comprising a cabinet in which clothes are contained during the drying operation, a door affording access to the interior of the cabinet, an electric motor mechanically arranged within the cabinet to drive operating mechanism therein, a main gas burner, a gas supply line connected thereto, a first electrically operated valve in said gas supply line adapted to control the supply of gas to the main burner, a second electrically operated valve in said supply line adapted to control the supply of gas to both a pilot burner and to the first electrically operated valve leading to the main burner, a pilot burner connected to the gas supply line between the first and second electrically operated valves, a door switch, a timer provided with a switch means, an electrical energization circuit, a warp switch having a heater element adapted to open the switch after being in the electrical circuit for a predetermined time, a flame switch actuable by the presence of a flame in said pilot burner, a first contact closed by the flame switch when no flame is present in the pilot burner, and a second contact closed by the flame switch when a flame is present in the pilot burner, the heater element of said warp switch being connected in said electrical circuit through the first contact of said flame switch, said first gas burner control valve being electrically connected to said circuit through said second contact of said flame switch, said timer switch and said door switch, said pilot valve being connected to said circuit through said warp switch.*

*7. A gas heated clothes drier comprising a cabinet for housing the drier apparatus and having a rotatable clothes drum journaled therein with a door adapted to open and afford access to said drum, an electric motor mechanically connected to said drum to rotate the same, a main gas burner for heating the air to be circulated within the drum and having a gas supply line connected thereto, a first electrically operated valve in said first supply line to control the gas supply to the burner from the supply line, a pilot burner connected to said supply line, a second electrically operated valve positioned to control the flow of gas to the pilot burner from the supply line, a door switch operative upon the opening and closing of the door, a timer provided with a switch means to open after a predetermined length of time, a control switch, an electrical energization circuit, a warp switch having a heater element and adapted to open after the heater element has been connected to said electrical circuit for a predetermined length of time, a flame switch actuatable by the presence of a flame in said pilot burner, said flame switch having a first contact closed when no flame is present in the pilot burner and a second contact closed when a flame is present in the pilot burner, said heater element of the warp switch being connected to said electrical circuit through the first contact of the flame switch, said drum rotating motor being connected to said circuit through the timer switch and said door switch, said first electrically operated valve for the main gas burner being connected to said circuit through the door switch, the timer switch means, and the second contact of the flame switch, and said second electrically operated valve*

*for the pilot burner being connected to said circuit through the warp switch and through said control switch, said control switch capable of terminating the supply of gas to the pilot burner at the termination of operation.*

*8. A gas heated clothes drier comprising a cabinet in which clothes are contained during the drying operation, a door affording access to the interior of the cabinet, an electric motor mechanically arranged within the cabinet to drive operating mechanism therein, a main gas burner, a gas supply line connected thereto, a first electrically operated valve in said supply line and adapted to control the supply of gas to the main burner, a pilot burner connected to the supply line, a second electrically operated valve positioned to control the supply of gas to the pilot burner from the supply line, a door switch, a timer provided with a switch means, an electrical energization circuit, a warp switch having a heater element adapted to open the switch after being in the electrical circuit for a predetermined time, a flame switch actuable by the presence of a flame in said pilot burner, a first contact closed by the flame switch when no flame is present in the pilot burner, and a second contact closed by the flame switch when a flame is present in the pilot*

*burner, the heater element of said warp switch being connected in said electrical circuit through the first contact of said flame switch, said first gas burner control valve being electrically connected to said circuit through said second contact of said flame switch, said timer switch and said door switch, said second pilot valve being connected to said circuit through said warp switch,*

References Cited in the file of this patent or the original patent

UNITED STATES PATENTS

| | | |
|---|---|---|
| 1,675,160 | Carroll | June 28, 1928 |
| 2,005,224 | Dunham et al. | June 18, 1935 |
| 2,373,189 | Klein | Apr. 10, 1945 |
| 2,398,880 | Broglie | Apr. 23, 1946 |
| 2,456,147 | Ray | Dec. 14, 1948 |
| 2,498,172 | Mintner et al. | Feb. 21, 1950 |
| 2,505,041 | Gorsuch | Apr. 25, 1950 |
| 2,506,517 | Moore | May 2, 1950 |
| 2,548,313 | Kauffman II | Apr. 10, 1951 |
| 2,564,863 | Strobel | Aug. 21, 1951 |
| 2,564,867 | Weber et al. | Aug. 21, 1951 |
| 2,590,808 | Wagner | Mar. 25, 1952 |